Patented Aug. 1, 1950

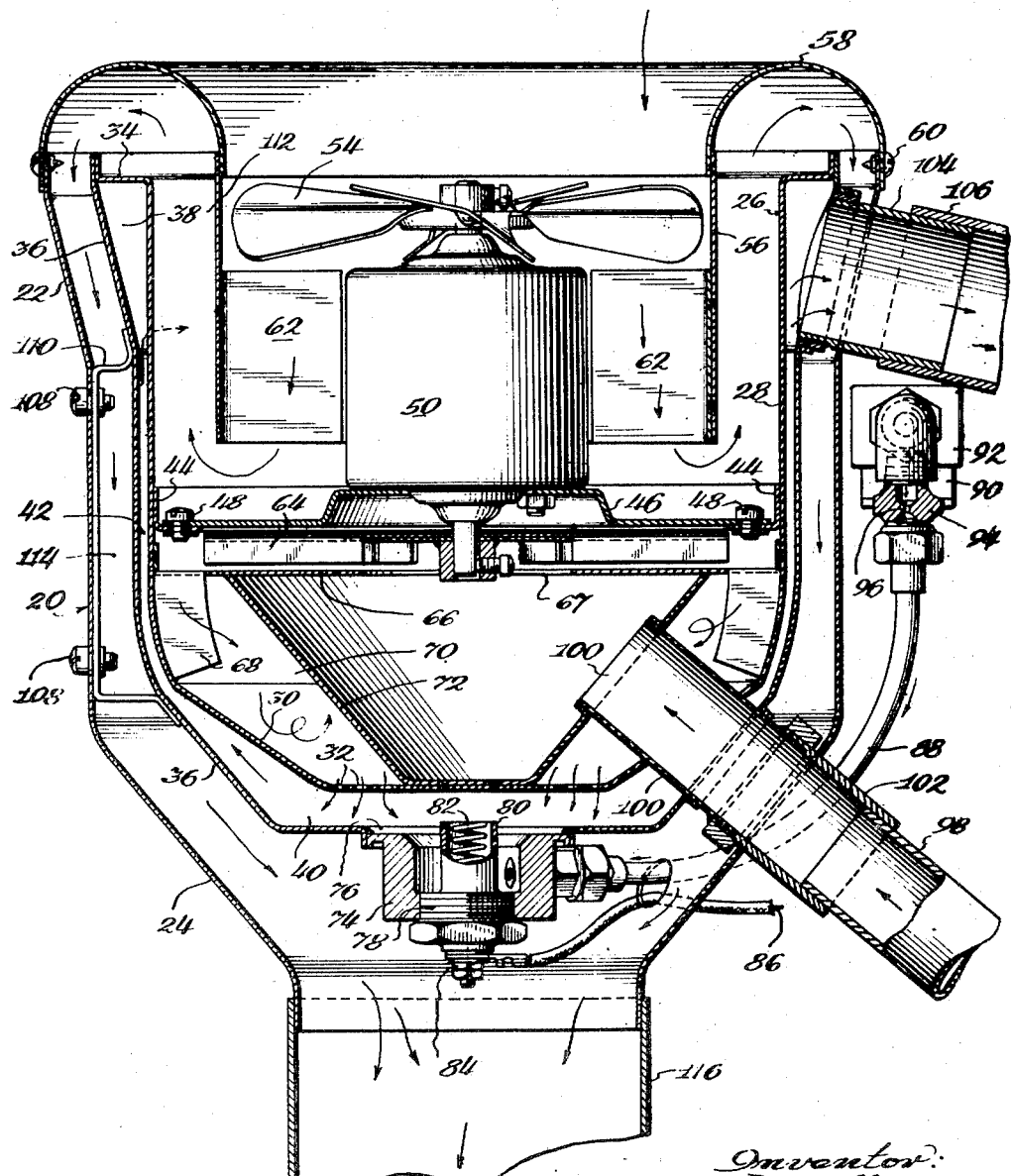

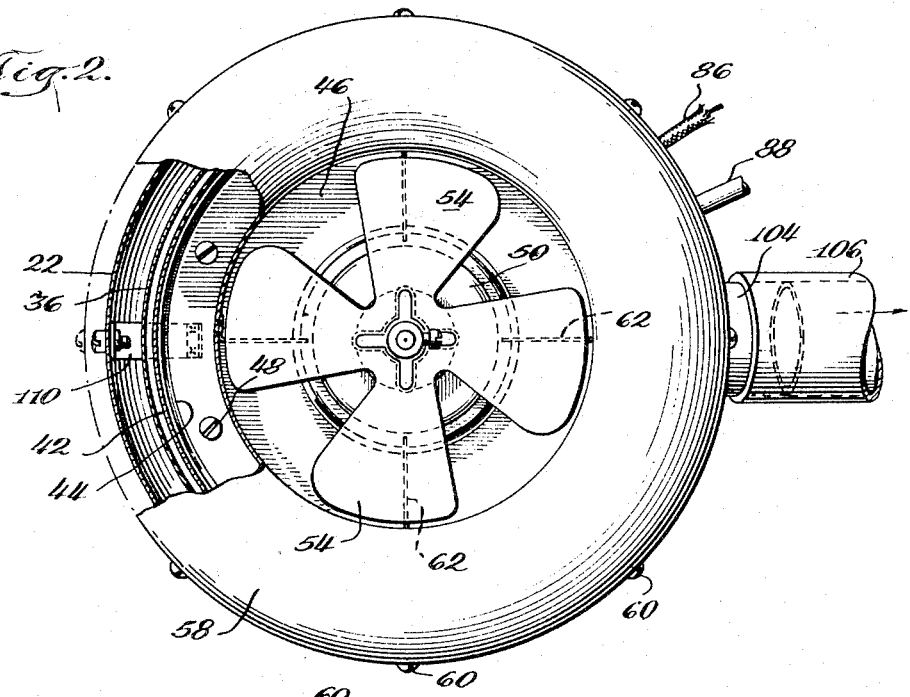
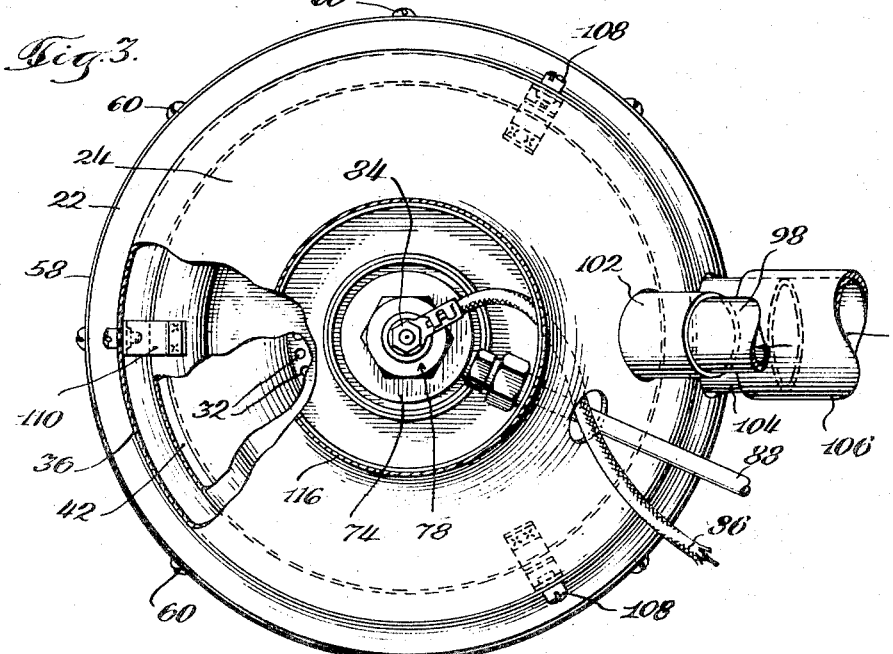

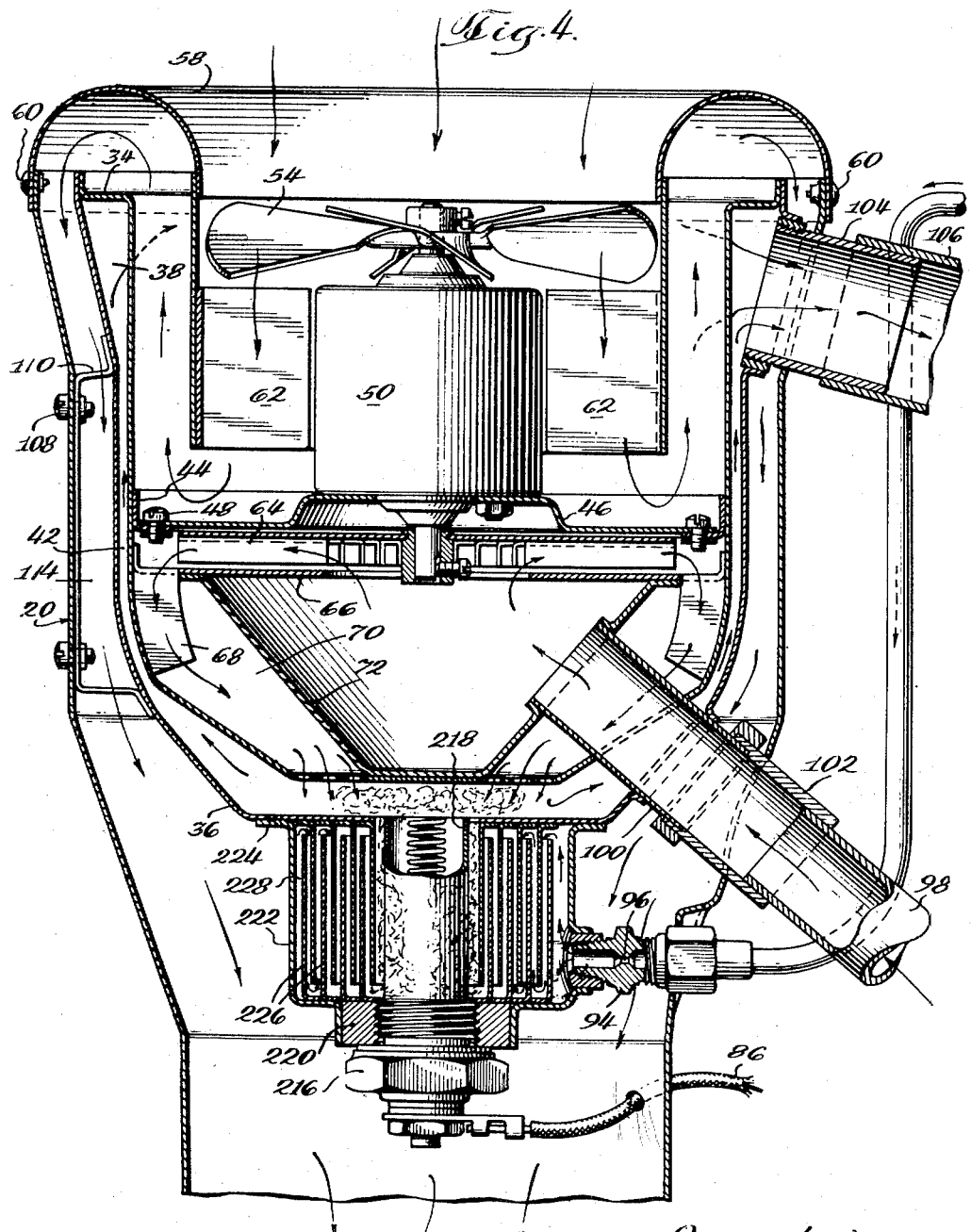

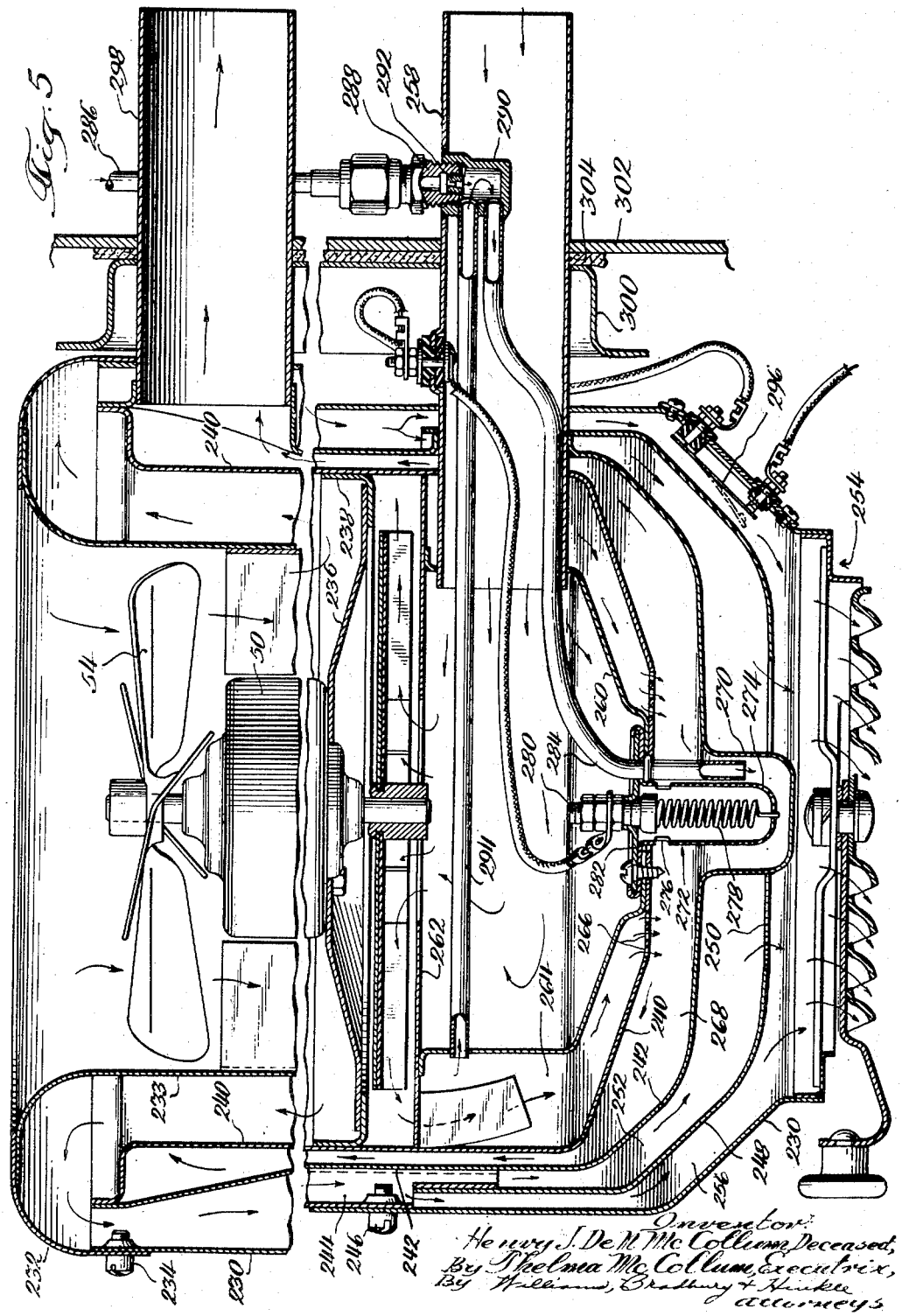

2,517,398

UNITED STATES PATENT OFFICE 2,517,398

FLUID FUEL BURNING INTERNAL-COMBUSTION AIR HEATER

Henry J. De N. McCollum, deceased, late of Chicago, Ill., by Thelma McCollum, executrix, Chicago, Ill., assignor to Stewart-Warner Corporation, Chicago, Ill., a corporation of Virginia Application March 23, 1945, Serial No. 584,359

6 Claims. (Cl. 126—110)

The invention relates generally to heaters, and more particularly to heaters burning liquid hydrocarbon fuels and usable to heat vehicles such as automobiles, trucks, tanks, boats, and airplanes, as well as for general heating purposes.

In commercially practical hydrocarbon fuel burning heaters used on automobiles and the like, it has become common practice to utilize the intake manifold vacuum as a source of suction for drawing the combustion air, and usually also the fuel, into the combustion chamber and withdrawing the products of combustion therefrom. A heater of this type is shown in Patent No. 2,242,316.

Heaters of this type cannot be operated while the automobile engine is not in operation, and therefore, to keep the passenger compartment of a parked automobile warm, it is necessary to maintain the engine in idling operation. Furthermore, while under most conditions the operation of the engine is not in any way affected by the discharge of the heater products of combustion into the intake manifold, in some small engines such dilution of the charge to the intake cylinders has a slight effect upon the smoothness of the engine operation, especially during idling.

It is therefore one of the main objects of the invention to provide an improved heater for automobiles and the like, which operates independently of the engine.

A further object is to provide an improved heater for use in automobiles and other vehicles, which has means to preheat the air supplied for combustion and thereby to increase the combustion rate, making it possible to generate heat at a high rate in a heater of relatively small overall dimensions.

A further object is to provide an improved heater for automotive vehicles, which will start readily at very low temperatures, in which fuel oils, kerosene, or gasoline, may be used as the fuel, and which will operate reliably under adversely varying conditions of temperature.

A further object is to provide an improved heater for automotive vehicles, which is constructed mainly of sheet metal and may thus be very economically manufactured.

A further object is to provide an improved heater, particularly for vehicles, which is light in weight and small in size, and in which the possibility of the escape of products of combustion from the heater into the passenger compartment is eliminated.

Other objects will appear from the following description, reference being had to the accompanying drawings, in which:

Fig. 1 is a central vertical sectional view of the improved heater;

Fig. 2 is a plan view thereof, to a reduced scale, portions being broken away to show the internal construction;

Fig. 3 is a bottom plan view of the heater, portions being broken away to show the internal construction, and to the same scale as Fig. 2;

Fig. 4 is a vertical sectional view of a modification, showing particularly, means for preheating the fuel as well as preheating the air for combustion; and Fig. 5 is a central vertical sectional view showing a further modification of the invention, in which means are provided to facilitate flow of fuel to the combustion chamber, and to prevent carbon formation in the fuel supply tube.

As shown in Fig. 1, the heater comprises an outer casing 20 having a flaring conical portion 22 at the top and an inwardly tapering conical portion 24 at the bottom. This casing is preferably made of thin sheet metal, such as stainless steel or copper, to which a suitable external finish may be applied. An inner shell 26 has a cylindrical portion 28 and a cup-shaped portion 30, the bottom of the cup-shaped portion 30 being provided with a plurality of spaced apertures 32 for the flow of air for combustion. The upper end of the shell 26 has an outwardly extending flange 34 which is joined to the upper edge of an intermediate shell 36. The shell 36 is shaped so as to provide a passageway 38, and conforms generally to the shape of the inner shell 26. The space between shells 28 and 36 also forms a combustion chamber 40 and a relatively narrow annular passageway 42 connecting the combustion chamber 40 with the passageway 38.

A flanged ring 44 is welded to the cylindrical portion 28 of the inner shell 26 and forms a mounting for a motor support plate 46, which is secured to the flanged ring by screws 48. A motor 50 is suitably secured to the plate 46, preferably in a substantially airtight manner. The motor 50 has a fan 54 secured to the upper end of its armature shaft to force air downwardly through a tube 56 which is secured to an annular return bend sheet 58, as by welding. The outer edge of the sheet 58 is secured to the upper edge of the outer casing 20 by a plurality of self-threading hardened screws 60.

A plurality of vertical baffles 62 are welded to the tube 56 and extend radially inwardly therefrom to direct the air flow from the fan 54 vertically downwardly and substantially to remove the circular component of motion therefrom.

The motor support sheet 46 forms the upper half of a housing for a blower rotor 64, secured to the lower end of the armature shaft of motor 50, the other portion of the housing for this rotor being provided by a sheet 66, the edges of which are flanged and welded to the cylindrical portion 28 of the inner shell 26. A plurality of baffles 68 are partially severed from the sheet 66 and extend downwardly into a space 70 formed between the cup-shaped portion 30 of the inner shell 26 and a conical filler cup 72. The openings in the sheet 66 provided by striking out the baffles 68 therefrom, permit the discharge of air impelled by the blower rotor 64 into the space 70, and thence through the ports 32 into the combustion chamber 40.

An igniter block 74 of generally cup-like shape, is welded in the bottom of intermediate shell 36, closing a flanged opening 76 formed therein. An igniter assembly 78 is threaded in the block 74, the igniter having a shell 80 within which there is located a coiled high resistance wire 82 preferably made of Nichrome, one end of the wire 82 being grounded to the shell 80, while the other end is suitably insulated from the shell and connected to a terminal binding post 84. Current for energization of the igniter is supplied through a conductor 86 connected to the binding post 84.

Liquid fuel is supplied to the igniter block 74 through a tube 88 suitably connected to the block, the tube being connected to a suitable source of fuel through a solenoid controlled valve 90 and a filter 92. The connection between the tube 88 and the filter 92 includes a fitting 94 having a minute orifice 96 for controlling the fuel flow rate.

Air for combustion is supplied from a suitable source through a pipe or hose 98 connected to a tube 100 by a suitable coupling connector 102. The tube 100 projects through flanged openings in the intermediate shell 36 and the conical filler cup 72, as well as through a tight fit opening formed in the inner shell 26.

The products of combustion escape from the passageway 38 through an exhaust fitting 104 to which an exhaust pipe or hose 106 may be connected.

In assembling the heater, the intermediate shell 36 and the inner shell 26 are assembled with the parts enclosed therewithin, as well as with the return bend sheet 58, and this subassembly inserted in the outer shell 20. Thereafter screws 108 may be threaded into suitable brackets 110 welded to the intermediate shell 36 and the screws 60 driven into the outer shell 22. After these parts have thus been assembled, the exhaust fitting 104 and combustion air inlet fitting 102 may be inserted to complete the assembly of the apparatus. In addition, a suitable thermostatic control may be provided to cause deenergization of the igniter 78 after the heater is operating normally.

In operation, a suitable master switch will be closed, thereby energizing the solenoid valve 90 to permit flow of fuel through the metering orifice 96 and into the space surrounding the igniter shell 80. The igniter will simultaneously be energized and within a short time will heat its shell 80 sufficiently to cause vaporization of some of the fuel supplied. At the same time, or shortly thereafter, the motor 50 will be energized, and thus through the inlet opening 67 in the blower housing plate 66, draw air from the space within the conical filler 72 and discharge it through the space 70 between this filler and the inner shell portion 30. The air will flow through the apertures 32 into the combustion space 40, where it will mix with the vaporized fuel and be ignited by the igniter 82. As air for combustion is supplied to the space 70, it comes in contact with the inner surface of the inner shell 26, particularly the portion 30 thereof, and is preheated. This preheating of the air is of considerable advantage in that it accelerates the rate of combustion of the fuel so that the fuel may be consumed with a high rate of heat production in the relatively small combustion space 40. The products of combustion flow upwardly through the passageways 42 and 38, and are exhausted through the discharge fitting 104.

Ventilating air is drawn into the heater by the fan 54 and flows past the baffles 62 and thence upwardly through a passageway 112 formed between the tube 56 and the inner shell 26, has its direction of flow reversed by the return bend sheet 58, and flows downwardly through the passageway 114 formed between the outer casing 20 and the intermediate shell 36. A suitable ventilating air conduit 116 connected to the lower end of the outer shell 20 conveys the heated air to the space to be heated.

In the installation of the heater upon an automobile, the hose or pipe 98 is preferably connected to the exterior of the automobile body so that there will not be any possibility of escape to the passenger compartment of fumes after the heater has been shut off. The exhaust pipe or conduit 106 is likewise connected to the exterior of the passenger compartment, either at the top of the vehicle or beneath the floor thereof. The exhaust conduit preferably terminates in an elbow or other suitable fitting, which, due to the flow of air during forward motion of the automobile, will create a slight partial vacuum and thereby assure that even if there should be some leakage from the space between the inner shell 26 and the intermediate shell 36, there will be no possibility of noxious fumes escaping to the passenger compartment.

The orifice 96 in the fitting 94 is made of such size and the fuel pressure is of such value that the fuel will flow to the igniter block 74 at a rate slightly less than the maximum rate at which the fuel can be consumed, taking into consideration the rate at which the combustion air is supplied through the ports 32. For convenience, the fuel used will usually be gasoline when the heater is installed upon an automobile, but the heater has been found to operate satisfactorily when using kerosene and other liquid hydrocarbon fuels.

The tube 88 connecting the metering orifice fitting 94 with the igniter block 74, is preferably made of sufficiently large diameter that it will not readily become clogged. The orifice fitting 94 is located sufficiently remote from the hotter portions of the heater that it is not liable to become clogged due to the residue which might result if the fuel were overheated.

The embodiment of the invention shown in Fig. 4 conforms generally to the embodiment shown in Figs. 1–3, and similar reference characters have therefore been applied to the corresponding parts.

In Fig. 4, the form of the igniter and the means by which the fuel is supplied to the igniter constitute the main differences as compared with the structure of Figs. 1–3. In Fig. 4 the igniter 216 has a relatively long shell portion 218, the igniter being threaded in a ring 220 which is welded or otherwise suitably secured in the bottom of a cup 222. The cup 222 has a flanged rim 224 welded to the bottom of the intermediate shell 36. Within the cup 222 are a plurality of flanged cylindrical sheets 226 having their flanges alternately welded to the bottom of the shell 36 and the bottom of the cup 222 or the ring 220. These sheets 226 thus form a long passageway 228 having concentric sections.

Fuel is supplied to the outer end of the passageway 228 through the orifice 96 of a flow metering fitting 94. As fuel commences to flow into the outer end of the passageway 228, it will first fill the outermost turn of this passageway and then dribble over the upper end of the outermost sheet 226. If the fuel is not vaporized, it will continue flowing over the upper ends of the alternate sheets 226 until it reaches the smallest diameter portion of the passageway 228. Since the passageway 228 is not of capillary dimensions, the bottom turns of the passageway, together with the portions thereof through which the fuel flows upwardly, will successively become filled with fuel while the portions of this passageway through which the fuel flows downwardly will remain substantially filled with air. As a result, the passageway is capable of building up a substantial hydrostatic head approximately five times the length of the sheets 226. The means forming the passageway 228 thus serve the unique function of preventing flooding of the heater in the event of an ignition failure, provided the head at which the fuel is supplied is not greater than five times the length of the sheets 226. At the same time this structure does not prevent flow of fuel into the cup 222 (at least into the outer section of the passageway 228) at very low hydrostatic heads. In normal operation, the heat imparted to the structure within the cup 222 by the igniter will be sufficient to vaporize the fuel as fast as it is supplied, so that not even the outermost section of the passageway 228 will become completely filled with fuel. By the use of this type of fuel supply means, a solenoid operated fuel valve in the fuel supply line is not required if the fuel source is a tank, float-bowl, or the like, which will supply the fuel reliably at a hydrostatic head not greater than four to five times the length of the sheets 226.

The form of the invention shown in Fig. 5 is particularly adapted for use in heating the passenger compartment of automobiles, trucks, busses, and the like. The heater comprises an outer casing 230 having a return bend 232 and a depending tube 233 detachably secured thereto by screws 234. As in the embodiment shown in Figs. 1–3, the motor 50 is supported on a plate 236 which, with a flanged ring 238, forms a partition across the inner shell 240. The intermediate shell 242 has its upper edge welded to the outwardly and upwardly flanged edge of the inner shell 240 and is supported from the outer casing by brackets 244. The brackets 244 are welded to the intermediate shell 242 and detachably secured to the outer casing 230 by screws 246.

Extending between the intermediate shell 242 and the outer casing 230, between the lower portions thereof, is a radiant heat reflector or shield 248 which may likewise be secured to portions of the brackets 244. This radiant heat reflector has a relatively large opening 250 in the center of the bottom thereof for the egress of a portion of the ventilating air which flows through a passageway 252 formed between the reflector 248 and the intermediate shell 242. The opening at the bottom of the casing 230 is provided with a suitable louvered and rotatably adjustable deflector assembly 254, by which the heated ventilating air may be deflected in the desired direction. It will be noted that some of the ventilating air flows through the passageway 252, while the remainder thereof may flow through a passageway 256 formed between the outer casing 230 and the reflector shield 248.

Air for combustion is supplied through a pipe 258 which projects through suitably formed openings in the casing 230, the reflector 248, the intermediate shell 242, the inner shell 240, and a filler cup 260. The upper edge of the filler 260 is flanged and welded to the centrally apertured blower casing plate 262. The space between the filler cup 260 and the inner shell 240 forms a passageway 264 for the flow of air from the outlet of the blower to ports 266 which lead into the combustion chamber 268. The air flowing through this passageway 264 is thus preheated by coming into contact with the hot walls of the inner shell 240.

The intermediate shell 242 is provided with a central well portion 270 of sufficient size to receive an igniter assembly 272, this assembly comprising a flanged closed end tube 274 having ports 276 and secured to the inner shell 240. Within the tube 274 there is located a coiled high resistance wire 278, one end of which is grounded to the closed end of the tube 274 and the other end of which is attached to a terminal 280 which is suitably insulated from, but supported by, a plate 282 crimped to the flange of the tube 274. A portion of the flange of the tube 274, as well as the plate 282, is slotted to receive a fuel supply tube 284, the latter projecting downwardly into the well 270 alongside the igniter tube 274.

Fuel is supplied to the heater from a suitable source through a tube 286 which terminates in a metering fitting 288 threaded in a double elbow 290 secured in the combustion air inlet pipe 258. Within the fitting 288 there is threaded a metering orifice plug 292 which may readily be removed for replacement by a similar plug having an orifice of a different size. The fuel supply tube 284 is suitably connected in the double elbow 290 and an air supply tube 294 leads directly from the passageway 264 to the double elbow 290.

The energizing circuit for the igniter preferably includes a bimetal thermostatic switch 296 having its bimetal switch arm in the ventilating air stream between the heat reflector 248 and the outer casing 230. The products of combustion are exhausted from the upper end of the passageway formed between the inner shell 240 and the intermediate shell 242 through a pipe 298.

The heater is suitably secured to a mounting plate 300 which in turn is secured to the fire wall 302 separating the passenger from the engine compartment of the vehicle, the mounting plate 300 being insulated from the wall 302 by a pad 304 of heat resistant material.

It will be noted that the entire conduit system by which fuel is supplied to the well 270, with the exception of the short length of the tube 284 which is adjacent the igniter 272, is positioned in the relatively cool combustion air stream, or is located on the side of the fire wall 302 opposite the heater. Thus there is little danger of any parts of the fuel conduit system becoming heated to a temperature at which the fuel flowing therein might crack and leave a residue. To further complement this object, the tube 294 is provided to conduct relatively cool air to the double elbow 290, this air flowing from the elbow 290 through the tube 284 and carrying with it the fuel which has been discharged through the orifice of the metering plug 292. Because of this continuous flow of air through the tube 284, the fuel will be caused to flow therethrough at a relatively rapid rate, thus further decreasing the possibility of any of the fuel being cracked in this tube.

The heater of Fig. 5, except as indicated above, will operate in the same manner as that shown in Figs. 1–3, and may be provided with any suitable type of control circuits.

Due to the interposition of the reflecting shield 248 between the intermediate wall 242 and the casing 230, the outer casing 230 is prevented from becoming excessively hot. Likewise, this reflecting shield improves the rate of heat transfer since this shield will become heated to a relatively high temperature due to heat radiated from the adjacent portions of the inner shell 242. In normal operation, the lower portion of the intermediate shell 242 becomes very hot and may be at red heat. The radiation from such red-hot portion of the shell 242 might cause the lower portion of the outer casing 230 likewise to become excessively hot from radiant heat if it were not for the interposition of the reflecting shield 248.

In general, it will be noted that in all of the embodiments of the invention, the combustion chamber, as well as the passageway for conveying the hot products of combustion from the combustion chamber to the exhaust or outlet fitting, comprises two adjacent walls of substantial area in which the ventilating air flows first along one side of this passageway and then along the other side of this passageway, thus assuring rapid heat transfer from the burning gases and products of combustion to the ventilating air.

In all embodiments of the invention the air for combustion is heated substantially before it flows into the combustion chamber. By thus preheating the combustion air, the rate of combustion is substantially increased so that a heater of relatively small overall dimensions may have a very high rate of heat output. Such preheating of the air causes combustion to take place at a higher temperature and thus the rate of heat transfer to the ventilating air is more rapid because of the higher temperature differential or heat gradient.

In all forms of the invention the combustion chamber is formed of relatively thin sheet metal which constitutes an excellent heat transfer medium, and the rate of heat transfer is also made very high because of the high velocity with which the products of combustion, as well as the ventilating air, pass along the opposite sides of these metal sheets.

Since substantially all of the parts of all forms of the heater are made of sheet metal, the heaters may be manufactured at a low cost and will be light in weight.

Since the fuel supply line is maintained at a relatively low temperature throughout the major portion of its length, the possibility of cracking of fuel therein is substantially reduced.

In all forms of the invention, the flow of both the ventilating air and the combustion air is produced by a single motor rotating a fan for supplying both the air for combustion and the ventilating air, or rotating a fan for supplying the ventilating air and a blower for supplying the combustion air.

Likewise, in all forms of the invention, the hottest parts of the heater are entirely enclosed and covered by the outer casing, with the latter spaced from the hottest heater parts to provide a passageway for the flow of ventilating air, the latter having the effect, to a greater or lesser extent, of insulating the outer casing from the parts of the heater which operate at very high temperatures. Thus no parts of the outer casing will be raised to a dangerously high temperature. In addition, in all forms of the invention the ventilating air is forced past the fan motor to cool the latter.

Each form of the heater disclosed herein is, or may be, a unit independent of the engine of the automotive vehicle upon which it is used. Installation of the heater is thereby greatly facilitated since it is necessary merely to mount the heater in the vehicle and to make the electrical connections to the battery or other source of electrical energy available on the vehicle. If desired, the fuel supply line for the heater may be connected to the fuel supply system for the internal combustion engine of the vehicle, although in many installations it may be found preferable to provide a separate fuel tank for the heater, particularly if it is desired to use cheaper fuels of lower grade than the gasoline used for the operation of the vehicle.

While several embodiments of the invention are disclosed herein, it will be apparent that numerous variations and modifications thereof may be made without departing from the underlying principles of the invention. It is therefore desired, by the following claims, to include within the scope of the invention all such variations and modifications by which substantially the results of the invention may be obtained through the use of substantially the same or equivalent means.

The invention claimed is:

1. In a heater, the combination of a pair of nested generally concentric shells forming a combustion chamber between their ends, said shells being of generally frusto-conical shape, a casing surrounding said shells and spaced therefrom to provide a ventilating air passageway, means for supplying liquid fuel to said combustion chamber at a controlled rate, means for supplying ventilating air to said heater and causing a flow of the same along the wall of the inner shell and thereafter through the ventilating air passageway between the outer shell and said casing and for supplying air for combustion including spaced walls extending transversely of said inner shell, said walls forming a blower casing, a motor mounted on one of said walls, a motor shaft extending through the wall upon which said motor is mounted, said other wall having a central opening and at least one opening adjacent its periphery, a blower rotor in said blower casing driven by said shaft, means for conducting air for combustion to the central opening in said wall and for conducting air from the peripheral opening in said wall to the space between said shells, and igniter means located in the space between said shells.

2. In a heater, the combination of a pair of nested generally concentric shells forming a combustion chamber between their ends, said shells being of generally frusto-conical shape, a casing surrounding said shells and spaced therefrom to provide a ventilating air passageway, means for supplying liquid fuel to said combustion chamber at a controlled rate, transverse partitioning means in said inner shell, a motor mounted on one side of said partitioning means, a generally frusto-conical wall on the other side of said partitioning means defining a combustion air inlet chamber, said frusto-conical wall being spaced from the walls of said inner shell and cooperating with the same to define a passageway for the flow of combustion air from said inlet chamber to said combustion chamber in heat exchange relation with the walls of said inner shell, means for admitting air to said combustion air inlet chamber, a first air circulating means driven by said motor for causing a flow of combustion air to said combustion air inlet chamber and through said combustion air passageway to said combustion chamber, means including a second air circulating means driven by said motor for supplying ventilating air to the heater on said one side of said partitioning means and causing a flow of ventilating air through said ventilating air passageway between the outer shell and said casing, and igniter means located in the space between said shells.

3. In a heater, the combination of a pair of unitary generally similarly shaped stamped sheet metal shells conformed to define complementary flanges on the upper ends of their side walls adapted to be secured to each other by seam-welding or the like for securing said shells in nested spaced relation, said shells defining a combustion chamber between their bottoms and a passageway between their side walls for the flow of products of combustion, a stamped sheet metal casing surrounding the outermost of said shells and secured thereto in spaced relation, said casing having a portion extending around the upper ends of said shells and downwardly along the upper portion of the inner shell to provide a continuous passageway for the flow of ventilating air to be heated, a stamped transverse partitioning means fixed to said inner shell in spaced relation to the inner end of the downwardly extending inner part on said casing to define an inlet to the ventilating air passageway and in spaced relation to the bottom of said inner shell, a stamped wall structure in the space between the bottom of said inner shell and said partitioning means defining a combustion air inlet chamber and cooperating with the inner shell to define a passageway for conducting air from said combustion air inlet chamber along the walls of said inner shell to said combustion chamber, means for conducting air to said combustion air inlet chamber, power driven air circulating means including means for causing a flow of ventilating air through said downwardly extending inner part of the casing and into and through said ventilating air passageway and means for causing a flow of air for combustion to said combustion air inlet chamber and forcing the same from said chamber through said combustion air passageway to said combustion chamber, means for supplying liquid fuel to said combustion chamber at a controlled rate, and igniter means located in the combustion chamber space between said shells.

4. A heater comprising a pair of generally similarly cup-shaped shells having closed bottoms, one of said shells being located within the other and the inner shell being of sufficiently smaller size to provide a combustion chamber between the bottoms of the shells and to provide a passageway between the sides thereof, said shells being sealed together at their upper ends, a casing spaced from and surrounding the outer shell and having a portion extending around the upper ends of the shells and downwardly along the upper portion of the inner shell to provide a continuous passageway for the flow of ventilating air to be heated, means including transverse partitioning means closing said inner shell above the bottom thereof to define a ventilating air chamber above the partitioning means, and structure below the partitioning means forming a combustion air inlet chamber and a combustion air passageway for conducting combustion air from said inlet chamber to said combustion chamber along the walls of said inner shell, a motor in the downwardly extending part of the casing, means on the upper side of said partitioning means driven by said motor for causing a flow of ventilating air into said inlet chamber and through said ventilating air passageway, and other means on the lower side of said partitioning means driven by said motor for drawing air into said combustion air inlet chamber and forcing the air from said chamber through the combustion air passageway into said combustion chamber, an electrical igniter located in the combustion chamber, and metering means supplying liquid fuel to the combustion chamber at a point near the igniter so that upon starting the igniter will vaporize the fuel.

5. In a heater, the combination of a pair of nested generally concentric shells forming a combustion chamber between their ends, said shells being of generally frusto-conical shape, a casing surrounding said shells and spaced therefrom to provide a ventilating air passageway, means for supplying liquid fuel to said combustion chamber at a controlled rate, means for supplying ventilating air to said heater and causing a flow of the same along the wall of the inner shell and thereafter through the ventilating air passageway between the outer shell and said casing and for supplying air for combustion including spaced walls extending transversely of said inner shell, said walls forming a blower casing, a motor mounted on one of said walls, a motor shaft extending through the wall upon which said motor is mounted, said other wall having a central opening and at least one opening adjacent its periphery, a blower rotor in said blower casing driven by said shaft, a shell between said other wall and the bottom of the inner one of the pair of shells forming said combustion chamber conformed to define a combustion air inlet chamber communicating with said central opening and cooperating with the walls of said inner shell to form a passageway for the flow of combustion air from the said peripheral opening to the combustion space in heat exchange relation with said inner shell, means to conduct air to said combustion air inlet chamber, and igniter means located in the space between said shells.

6. In a heater, the combination of a pair of nested generally concentric shells forming a combustion chamber between their ends, said shells being of generally frusto-conical shape, a casing surrounding said shells and spaced therefrom to provide a ventilating air passageway, means for supplying liquid fuel to said combustion chamber at a controlled rate, means for supplying ventilating air to said heater and causing a flow of the same along the wall of the inner shell and thereafter through the ventilating air passageway between the outer shell and said casing and for supplying air for combustion including spaced walls extending transversely of said inner shell, said walls forming a blower casing, a motor mounted on one of said walls, a motor shaft extending through the wall upon which said motor is mounted, said other wall having a central opening and at least one opening adjacent its periphery, a blower rotor in said blower casing driven by said shaft, means for conducting air for combustion to the central opening in the said wall and from the peripheral opening therein to the combustion chamber including means forming a combustion air inlet chamber communicating with said central opening and having wall structure spaced from the walls of said combustion chamber to form a passageway between the peripheral opening and combustion chamber, and igniter means located in the space between said shells.

THELMA McCOLLUM,
*Executrix of the Last Will and Testament of Henry J. De N. McCollum, Deceased.*

REFERENCES CITED

The following references are of record in the file of this patent:

UNITED STATES PATENTS

| Number | Name | Date |
| --- | --- | --- |
| 400,886 | Williams | Apr. 2, 1889 |
| 840,657 | Reed | Jan. 8, 1907 |
| 2,110,222 | Hammers et al. | Mar. 8, 1938 |
| 2,137,581 | Myler | Nov. 22, 1938 |
| 2,158,338 | Rock | May 16, 1939 |
| 2,221,842 | Miller | Nov. 19, 1940 |
| 2,268,068 | Deming | Dec. 30, 1941 |
| 2,286,853 | Holthouse | June 16, 1942 |
| 2,314,089 | Hess et al. | Mar. 16, 1943 |
| 2,408,691 | Shaw | Oct. 1, 1946 |

FOREIGN PATENTS

| Number | Country | Date |
| --- | --- | --- |
| 766,665 | France | Apr. 16, 1934 |